United States Patent
Kim et al.

(10) Patent No.: US 8,394,555 B2
(45) Date of Patent: Mar. 12, 2013

(54) MEMBRANE-ELECTRODE ASSEMBLY FOR FUEL CELL AND FUEL CELL SYSTEM COMPRISING SAME

(75) Inventors: Hee-Tak Kim, Suwon-si (KR); Ho-Jin Kweon, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 914 days.

(21) Appl. No.: 11/495,532

(22) Filed: Jul. 31, 2006

(65) Prior Publication Data

US 2007/0026293 A1    Feb. 1, 2007

(30) Foreign Application Priority Data

Jul. 29, 2005    (KR) .................. 10-2005-0069459

(51) Int. Cl.
*H01M 4/02*    (2006.01)
*H01M 4/88*    (2006.01)
*B05D 5/12*    (2006.01)

(52) U.S. Cl. ......... 429/532; 429/530; 427/115; 502/101

(58) Field of Classification Search .................. None
See application file for complete search history.

(56) References Cited

U.S. PATENT DOCUMENTS

| 7,063,913 B2 | 6/2006 | Ji |  |
|---|---|---|---|
| 2005/0053826 A1* | 3/2005 | Wang et al. | 429/44 |
| 2005/0175880 A1* | 8/2005 | Cho et al. | 429/33 |
| 2006/0141338 A1* | 6/2006 | Wang et al. | 429/44 |

FOREIGN PATENT DOCUMENTS

| JP | 2001-338655 | 12/2001 |
|---|---|---|
| KR | 10-2004-0022002 | 3/2004 |
| KR | 10-2004-0073494 | 8/2004 |
| KR | 10-2004-0104839 | 12/2004 |
| WO | WO 03092095 | 11/2003 |

OTHER PUBLICATIONS

SiGRACET Fuel Cell Components http://www.sglcarbon.de/sgl_t/fuelcell/index.html, Jul. 19, 2006.
Bipolar plates for fuel cells and redox-flow batteries http://www.sglcarbon.de/sgl_t/expanded/innovative/bipolar_plates.html.
Dupont Nafion PFSA Membranes NE-1135, N-115, N-117, NE-1110 http://www.dupont.com/fuelcells/pdf/dfc101.pdf, 2005.
SIGRATHERM Rigid Graphite Felt http://www.sglcarbon.de/gs/prodser/sigratherm/rigid_felt.html, Jul. 19, 2006.
Vulcan XC-72R http://www.cabot-corp.com/cws/product.nsf/PDSKEY/~~~VXC72R/$file/VULCAN__XC72R.pdf?OpenElement, Nov. 2002.
Cabot's Fine Particle Technology http://www.cabot-corp.com/cws/functions.nsf/CWSID/cwsFUN200407201330PM5011?OpenDocument, Jul. 20. 2006.

* cited by examiner

*Primary Examiner* — Patrick Ryan
*Assistant Examiner* — Sarah A Slifka
(74) *Attorney, Agent, or Firm* — Robert E. Bushnell, Esq.

(57) ABSTRACT

A membrane-electrode assembly constructed with an anode and a cathode facing each other, and a polymer electrolyte membrane disposed therebetween. At least one of the anode and the cathode includes an electrode substrate that includes a carbon fiber based sheet coated with micro-carbons and a catalyst layer disposed on the electrode substrate with the micro-carbons contacting the catalyst layer.

18 Claims, 9 Drawing Sheets

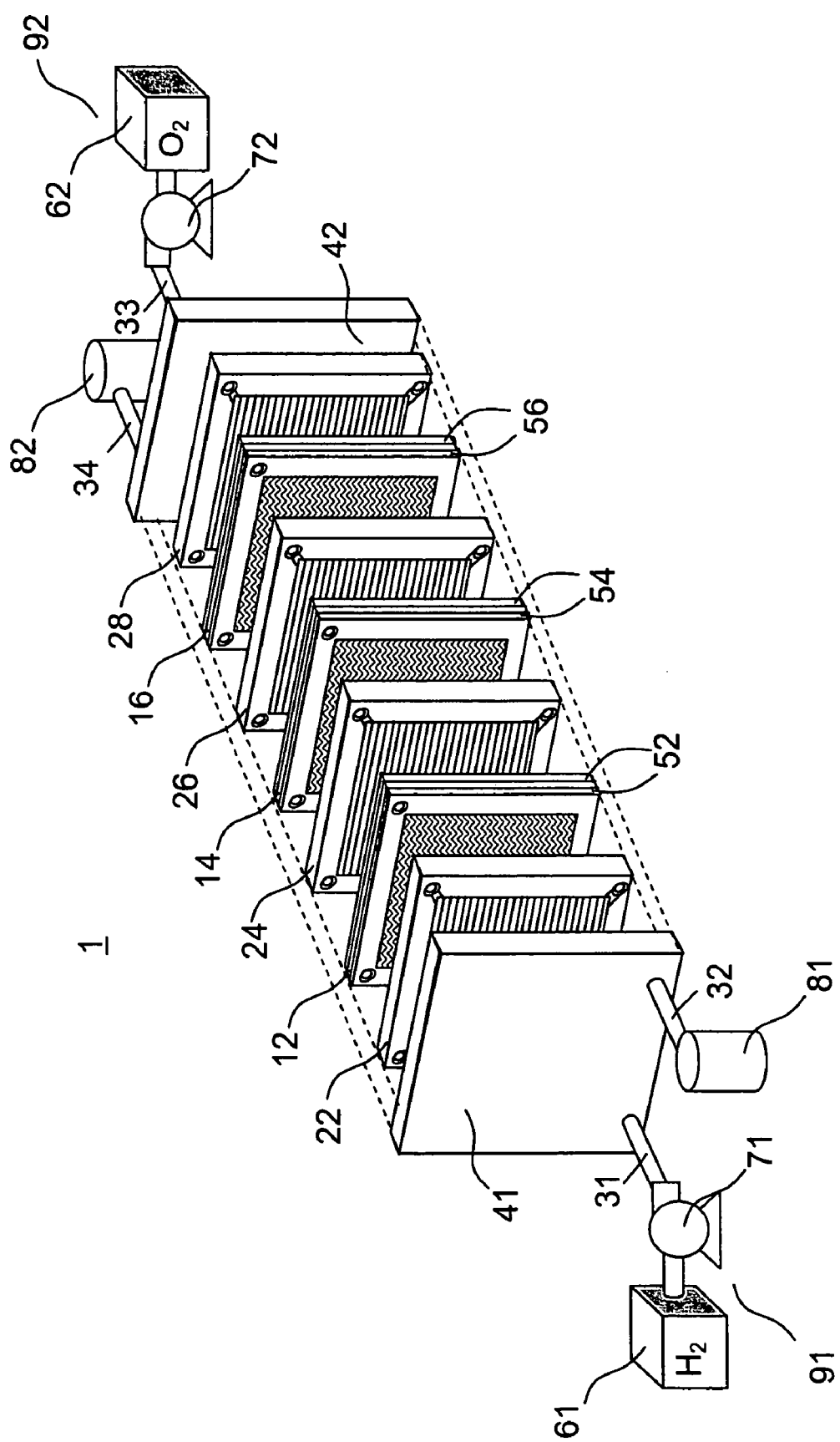

Voltage-current density curve Of FIG. 5

Power density-current density curve Of FIG. 5

FIG. 8
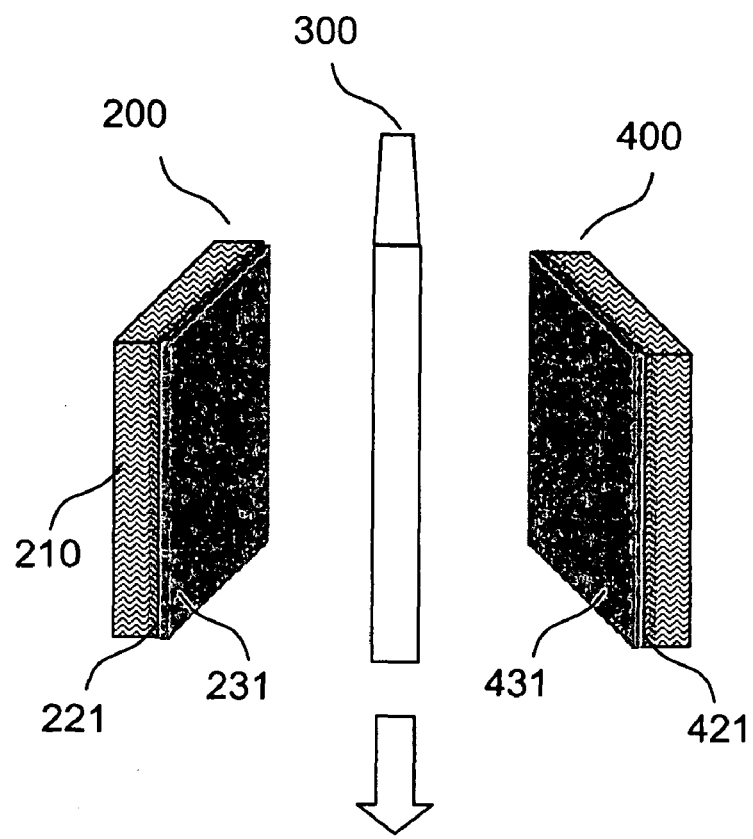
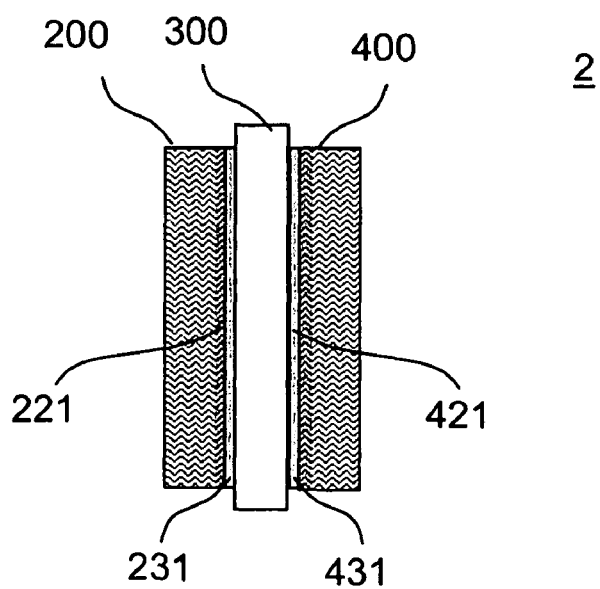

MEMBRANE-ELECTRODE ASSEMBLY FOR FUEL CELL AND FUEL CELL SYSTEM COMPRISING SAME

CLAIM OF PRIORITY

This application makes reference to, incorporates the same herein, and claims all benefits accruing under 35 U.S.C.§119 from an application for *MEMBRANE/ELECTRODE ASSEMBLY FOR FUEL CELL AND FUEL CELL SYSTEM COMPRISING THE SAME* earlier filed in the Korean Intellectual Property Office on 29 Jul. 2005 and there duly assigned Serial No. 10-2005-0069459.

BACKGROUND OF THE INVENTION

1. Field of the Invention

The present invention relates to a membrane-electrode assembly for a fuel cell and a fuel cell including the membrane-electrode assembly. More particularly, the present invention relates to a membrane-electrode assembly that has strong adherence between an electrode substrate and a catalyst layer and that permits smooth mass transfer, and a fuel cell including that membrane-electrode assembly.

2. Description of the Related Art

A fuel cell is a power generation device producing electrical energy through an electrochemical redox reaction between an oxidant and a fuel such as hydrogen, or a hydrocarbon-based material such as methanol, ethanol and natural gas.

Representative exemplary fuel cells include a polymer electrolyte membrane fuel cell (PEMFC) and a direct oxidation fuel cell (DOFC). Direct oxidation fuel cells include direct methanol fuel cells which use methanol as a fuel.

Polymer electrolyte fuel cells have the advantages of high energy density and high power, but also have the problems of requiring careful handling of the hydrogen gas and requiring accessory facilities such as a fuel reforming processor for reforming methane or methanol, natural gas, and the like in order to produce hydrogen as the fuel gas.

On the contrary, although the energy density of the direct oxidation fuel cell is lower than that of the gas-type fuel cell, it has the advantages of easy handling of the liquid-type fuel, low operation temperature, and no need for additional fuel reforming processors. Therefore, the direct oxidation fuel cell has been acknowledged as an appropriate system for a portable power source for use as small and common electrical equipments.

In the above-mentioned fuel cell, a fuel cell stack that generates substantial electricity includes several to scores of unit cells stacked adjacent to one another, and each unit cell is formed with a membrane-electrode assembly (MEA) and a separator (which is also referred to as a bipolar plate).

The membrane-electrode assembly is composed of an anode (which is also referred to as a "fuel electrode" or an "oxidation electrode") and a cathode (which is also referred to as an "air electrode" or a "reduction electrode"), that are separated by a polymer electrolyte membrane.

The anode and the cathode are generally composed of an electrode substrate, such as a carbon paper or a carbon cloth, and a catalyst layer. An electrode having this structure has a weak adherence between the electrode substrate and the catalyst layer, thereby deteriorating fuel diffusion.

The above information disclosed in this background section is only for enhancement of understanding of the background of the invention and therefore, it should be understood that the above information may contain information that does not necessarily form the prior art or the described art that is already known in this country by a person or ordinary skill in the art.

SUMMARY OF THE INVENTION

It is therefore, one object of the current invention to provide an improved membrane-electrode assembly and a fuel cell incorporating an improved membrane-electrode assembly.

One embodiment of the present invention provides a membrane-electrode assembly that has strong adherence between an electrode substrate and a catalyst layer and provides smooth mass transfer of a fuel, an oxidant, and water.

Another embodiment of the present invention provides a fuel cell that includes the membrane-electrode assembly.

In an embodiment of the present invention, a membrane-electrode assembly for a fuel cell includes an anode and a cathode facing each other, and a polymer electrolyte membrane disposed therebetween. At least one of the anode and the cathode includes an electrode substrate that uses a sheet of carbon fiber based material coated with micro-carbons and a catalyst layer disposed on the electrode substrate.

The carbon fiber based sheet coated with micro-carbons in the electrode substrate is oriented with the micro-carbons contacting the catalyst layer.

In another embodiment of the present invention, a fuel cell system includes at least one electricity generating element, a fuel supplier, and an oxidant supplier. The electricity generating element includes the above described membrane-electrode assembly and separators arranged at each side thereof. The electricity generating element generates electricity by the oxidation of a fuel and the reduction of an oxidant. The fuel supplier supplies the fuel to the electricity generating element. The oxidant supplier supplies the oxidant to the electricity generating element.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein:

FIG. 4 is an exploded perspective view of a stack of a fuel cell system constructed as one embodiment of the present invention.

FIG. 8 illustrates a fabrication process for fabricating a membrane-electrode assembly with catalyst layer on the anode according to the principles of the present invention as explained in Example 1.

DETAILED DESCRIPTION OF THE INVENTION

A membrane-electrode assembly is typically constructed with a cathode, an anode, and a polymer electrolyte membrane between the cathode and the anode. A fuel is supplied to the anode and an oxidant is supplied to the cathode. The fuel is oxidized to produce protons that are transferred into the cathode through a polymer electrolyte membrane. The oxidant is reduced at the cathode to produce electricity along with water.

Accordingly, the fuel, the oxidant, and the water can flow smoothly around the cathode and the anode, resulting in an improvement of cell performance.

Generally, a micro-carbon layer is formed on an electrode substrate, such as a carbon paper or a carbon cloth, made in the form of a separate layer, and then a catalyst layer is formed upon the micro-carbon layer. Such an electrode has an advantage of excellent electron transfer, but has a disadvantage in fuel supply due to a mass transfer resistance.

According to one embodiment, micro-carbons are coated on a top surface of a carbon fiber based sheet, of which an electrode substrate is composed, to integrally form a micro-carbon layer and an electrode substrate. Therefore, an adherence between an electrode substrate and a catalyst layer is enhanced and pores of the electrode substrate are not clogged by micro-carbons, resulting in an improvement of mass transfer.

Figure 1:
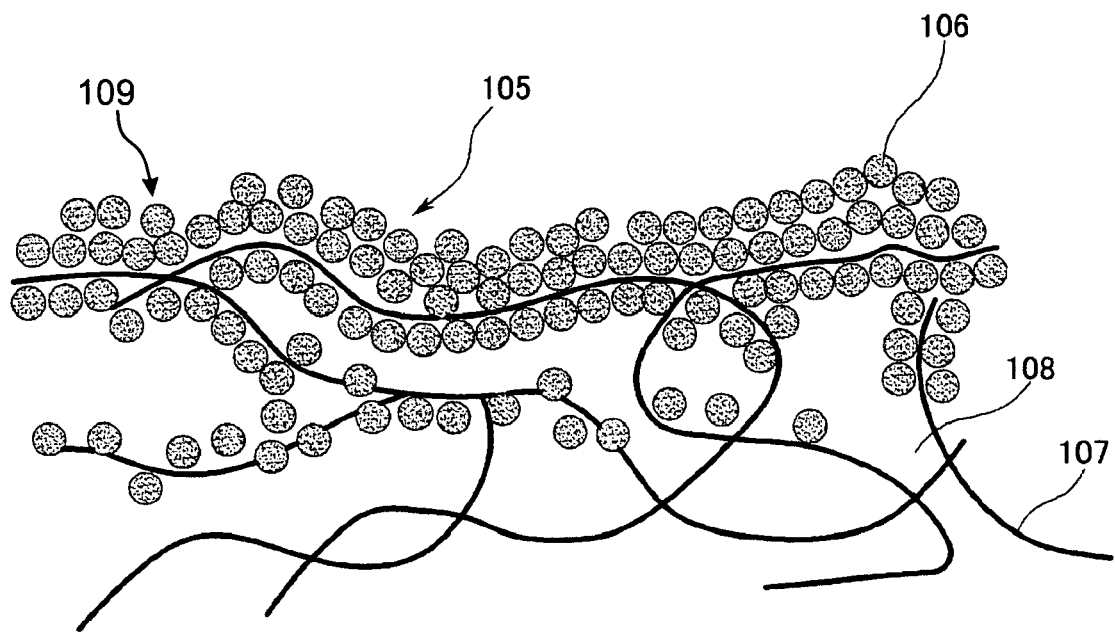
FIG. 1 is a schematic cross-sectional view of an electrode substrate constructed as one embodiment of the present invention.

FIG. 1 is a schematic cross-sectional view showing an electrode substrate constructed as one embodiment of the present invention, with carbon fibers 107 of an electrode substrate 105 coated with micro-carbons 106 to form micro-carbon layer 109 integrated within electrode substrate 105. In such a structure, pores 108 of electrode substrate 105 are not clogged by micro-carbons 106.

When micro-carbons are formed in a separate layer on the electrode substrate, the micro-carbons may reduce pore size and porosity, resulting in a deterioration of mass transfer characteristics. On the contrary, when micro-carbons are coated onto the carbon fibers forming the electrode substrate, the coated micro-carbons do not reduce pore size and porosity, resulting in an improvement of mass transfer characteristics.

When micro-carbons are formed in a separate layer on the electrode substrate, the proportion of pores that are larger than 10 microns is less than 5% of the total pores, and the porosity of a micro-carbon layer is 30 to 70%. On the contrary, when micro-carbons are coated onto the carbon fibers forming the electrode substrate, the proportion of pores that are larger than 10 microns is 20 to 80% and the porosity of an electrode substrate is 70 to 90%.

The pore size and porosity can be controlled to be within a suitable range.

The electrode substrate plays a role of supporting an electrode and also of spreading a fuel and an oxidant to a catalyst layer to facilitate the approach of the fuel and the oxidant to the catalyst layer.

As for the electrode substrate, an electrically conductive substrate is used, for example, a carbon paper, a carbon cloth, a carbon felt, or a metal cloth on a porous film made of a metal cloth fiber or a metalized polymer fiber, but is not limited thereto.

In an embodiment, the electrode substrate has a thickness ranging from 100 to 600□, and preferably from 200 to 400□. When the thickness of the electrode substrate is more than 600□, mass transfer resistance becomes large, whereas when it is less than 100□, diffusion does not occur uniformly. Since the electrode of the present invention does not further include a separate microporous layer, the electrode may be thinner than that of the conventional art.

The micro-carbons may include carbon black, activated carbon, carbon nanotube, carbon nanofiber, carbon nanowire, carbon nanohom, and carbon nanoring, or combinations thereof, but are not limited thereto.

The micro-carbons may be coated on a surface of the carbon fiber (or metal fibers, if metal cloth is used to form the electrode substrate) based sheet in a thickness between approximately 1 µm to approximately 50 µm, and preferably 5 µm to 20 µm.

When the coating thickness is less than 1 µm, an adherence between the electrode substrate and the catalyst layer is weak; when the coating thickness is more than 50 µm, pores of the electrode substrate may become small and thus make mass transfer difficult.

According to one embodiment of the present invention, 0.1 mg to 10 mg of micro-carbons are present per 1 $cm^2$ of the electrode substrate, and preferably 0.2 to 2 mg of micro-carbons are present per 1 $cm^2$ of the electrode substrate.

When the micro-carbons are present in an amount less than 0.1 mg per 1 $cm^2$, adherence between the electrode substrate and the catalyst layer may become weak; when the amount is more than 10 mg per 1 $cm^2$, fuel diffusion may be inhibited.

The micro-carbons coated on a carbon fiber based sheet in an electrode substrate contact the catalyst layer.

The micro-carbons may be coated on a surface of the carbon fiber based sheet along with a resin binder.

The resin binder increases water repellency of the electrode substrate, i.e., increases the hydrophobicity of the electrode substrate, and thereby enhances water releasing and gas transmission. The resin binder also increases mechanical strength of the electrode substrate.

The binder resin includes polytetrafluoro ethylene (PTFE), polyvinylidene fluoride (PVdF), polytrifluorochloroethylene, FEP (fluorinated ethylenepropylene), and a copolymer of polyvinylidene fluoride and hexafluoropropylene (PVdF-HFP). Accordingly, the electrode substrate of the present invention does not have to be subjected to water-repellent treatment.

The amount of the binder resin may be between approximately 2 to approximately 200 parts by weight, and preferably within a range of approximately 5 to 120 parts by weight, with respect to 100 parts by weight of micro-carbons.

When the amount of the binder resin is less than 2 parts by weight, the binder resin functions insufficiently, when the amount is more than 200 parts by weight, the electroconductivity of the micro-carbons may be deteriorated.

As described above, the electrode substrate constructed as one embodiment of the present invention may be used in the anode or the cathode, and more preferably, in the anode.

The electrode substrate having the above structure has an excellent adherence to the catalyst layer and improved mass transfer characteristics.

Since a smooth fuel supply has a relatively great effect on cell performance, the electrode substrate may be used effectively in an anode to which fuel is supplied.

Figure 3:
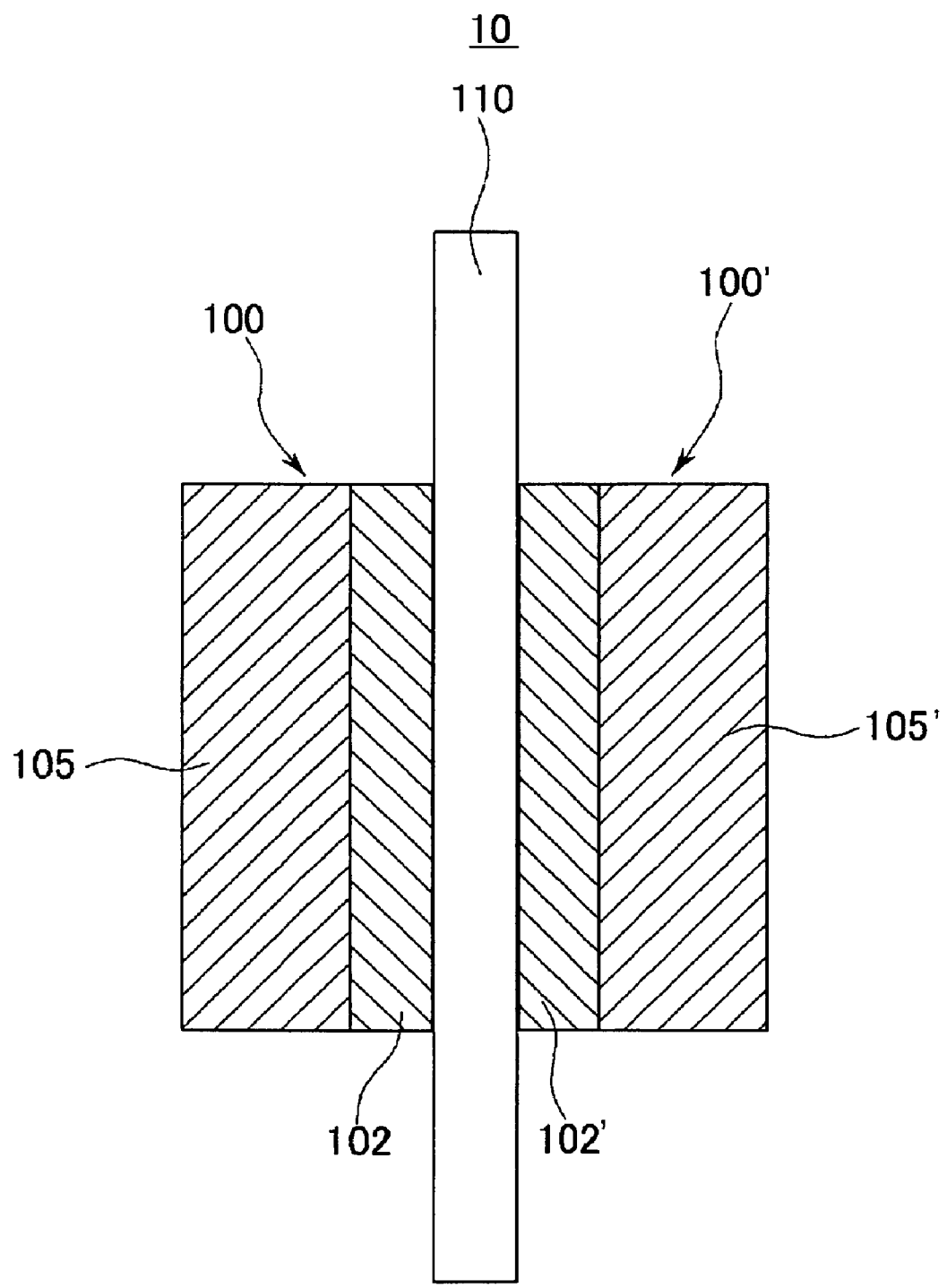
FIG. 3 is a schematic cross-sectional view of a membrane-electrode assembly constructed according to the principles of the present invention as one embodiment of the present invention.

FIG. 3 is a schematic cross-sectional view showing a membrane-electrode assembly for a fuel cell constructed as one embodiment of the present invention.

Referring to FIG. 3, membrane-electrode assembly 10 including the above electrode has polymer electrolyte membrane 110 with electrodes 100 and 100' disposed at each side of polymer electrolyte membrane 110.

Electrodes 100 and 100' include electrode substrates 105 and 105' and catalyst layers 102 and 102' disposed on the surfaces of electrode substrates 105 and 105'.

In the above membrane-electrode assembly 10, electrode 100 disposed on one side of polymer electrolyte membrane 110 is an anode (or in an alternative embodiment, a cathode), and electrode 100' disposed on the other side of polymer electrolyte membrane 110 is a cathode (or alternatively, an anode).

At a catalyst layer 102 of the anode, a fuel transferred through an electrode substrate 105 is oxidized to produce protons and electrons. The protons are transferred to the cathode and the electrons are transferred from the anode to an external circuit connected across the fuel cell. The flow of electrons generates electricity. At a catalyst layer 102' of the cathode, an oxidant transferred through an electrode substrate 105' is reduced by reaction with the protons transferred from the anode and the electrons transferred back from the external circuit, and water is produced.

The catalyst layer may include a metal catalyst to facilitate the related reaction (oxidation of hydrogen and reduction of oxygen). The metal catalyst may include at least one material selected from the group of platinum, ruthenium, osmium, platinum—ruthenium alloys, platinum—osmium alloys, platinum—palladium alloys, or platinum-M alloys where M is at least one transition elements selected from the group of Ga, Ti, V, Cr, Mn, Fe, Co, Ni, Cu, Zn, Sn, Mo, W, and Rh. Preferred catalysts are selected from the group of platinum, ruthenium, osmium, platinum—ruthenium alloys, platinum—osmium alloys, platinum—palladium alloys, platinum—cobalt alloys, and platinum—nickel alloys.

The metal catalyst may be supported on a carrier or may be an unsupported layer.

The carrier may include carbon such as acetylene black, denka black, activated carbon, ketjen black, graphite, or an inorganic material of particulates such as alumina, silica, titania, zirconia, and so on. In general, carbon is used as a carrier.

Polymer electrolyte membrane 110 functions as an ion exchange, transferring protons generated in an anode catalyst to a cathode catalyst, and thus may include a highly proton conductive polymer.

The proton conductive polymer may be a polymer resin having a cation exchange group selected from the group of a sulfonic acid group, a carboxylic acid group, a phosphoric acid group, a phosphonic acid group, and derivatives thereof, at its side chain.

The polymer electrolyte membrane may include at least one selected from the group of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyetheretherketone-based polymers, and polyphenylquinoxaline-based polymers. In a preferred embodiment, the polymer electrolyte membrane includes proton conductive polymers selected from the group of poly(perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

In general, the polymer membrane has a thickness ranging from approximately 10 to approximately 200 μm.

The membrane-electrode assembly may be applied to a phosphoric acid-type, a polymer electrolyte-type, or a direct oxidation-type fuel cell system. Particularly, it may preferably be applied to a direct oxidation fuel cell system.

In the case of a direct oxidation fuel cell system, a liquid fuel is directly supplied to a fuel cell stack, and therefore the resistance of mass transfer may affect a cell's performance. In this regard, the membrane-electrode assembly may advantageously be applied to a direct oxidation fuel cell system.

A fuel cell system incorporating the membrane-electrode assembly of the present invention may be constructed with at least one electricity generating element, a fuel supplier, and an oxidant supplier. Separators are disposed on each side of the membrane-electrode assembly to form an electricity generating element and to individually supply a fuel and an oxidant to catalyst layers. The electricity generating element generates electricity by an electrochemical reaction between the fuel and the oxidant.

The electricity generating elements are stacked to form a fuel cell stack.

FIG. 4 is an exploded perspective view of a fuel cell stack constructed according to one embodiment of the present invention, with a fuel cell stack 1 may be formed with membrane-electrode assemblies 12, 14, 16 and separators 22, 24, 26, 28 disposed at each side of the membrane-electrode assemblies. Fuel cell stack 1 is clamped between opposite end plates 41 and 42. Non-conductive gaskets 52, 54 and 56 provide seals and electrical insulation between the several components of fuel cell stack 1.

Fuel supplier 91 and its fuel tank 61 and fuel pump 71, supplies a fuel, such as hydrogen, to the electricity generating element through supply pipe 31; and oxidant supplier 92 and its oxidant tank 62 and oxidant pump 72, supplies an oxidant to the electricity generating element through supply pipe 33. Additional pipes 32 and 34 supply liquid coolant from coolant reservoirs 81 and 82, to the separators 22, 24, 26, 28 and end plates 41 and 42.

As described above, the fuel cell system may be a phosphoric acid-type, a polymer electrolyte-type, or a direct oxidation-type fuel cell system, and preference is currently given to a direct oxidation fuel cell system.

The following examples illustrate the present invention in more detail. However, it is understood that the present invention is not limited by these examples.

EXAMPLE 1

Figure 7:
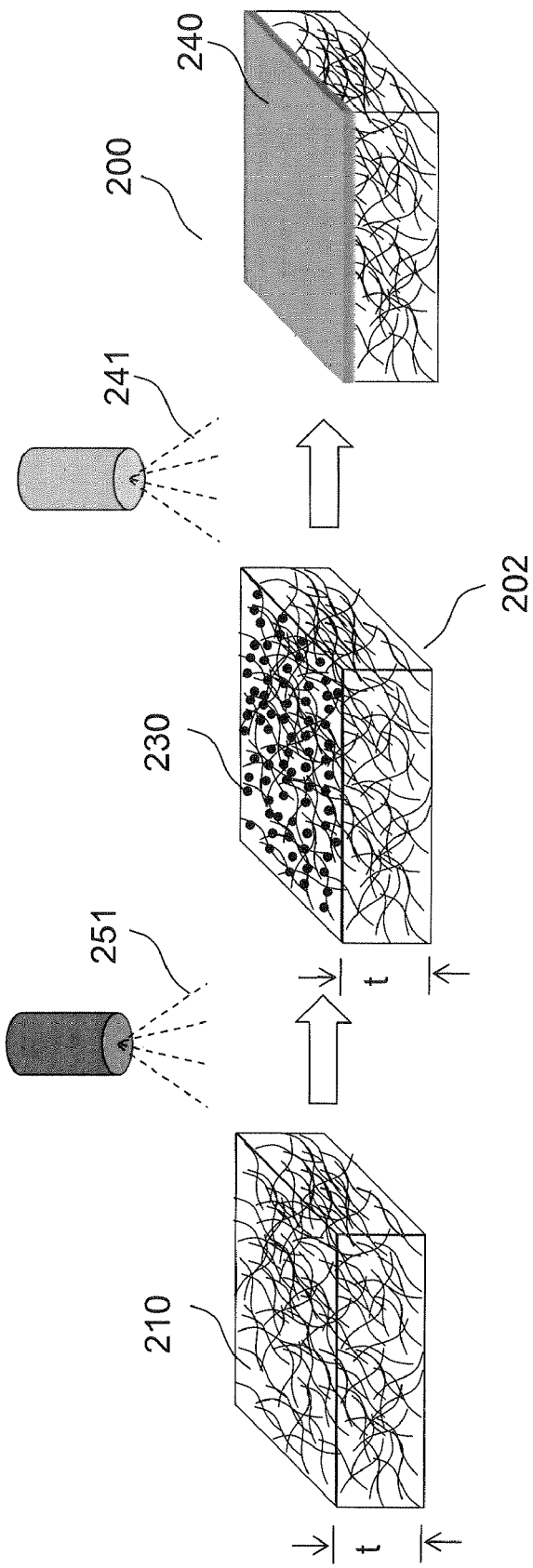
FIG. 7 illustrates a fabrication process for fabricating an anode used in a fuel cell according to the principles of the present invention as explained in Example 1.

A micro-carbon composition 251 (FIG. 7) was prepared by adding 5 g of carbon black (e.g., VULCAN XC-72R, available from Cabot Co.) and 5 g of polytetrafluoroethylene to 495 ml of 2-propanol and mixing the resulting composition by using ultrasound. As represented by FIG. 7, micro-carbon composition 251 was spray-coated onto a surface of a carbon paper 210, the thickness of which is t, (e.g., SGL Carbon Group carbon paper 10AA) to fabricate an anode substrate 202, the thickness of which is not increase, and which remains as t, including a carbon fiber based sheet 210 coated with carbon black 230 (e.g., Vulcan XC-72) in an amount of 0.2 mg/cm². The micro-carbon layer is integrated with carbon fiber based sheet 210.

A catalyst composition 241 was prepared by mixing 1 g of Pt—Ru black (Pt—Ru), 0.12 g of NAFION® polymer dispersion (available from E.I. duPont de Nemours and Co.), and 9 ml of an isopropyl alcohol solvent. Catalyst composition 241 was spray-coated on the fabricated anode substrate 202 to prepare an anode by forming a catalyst layer 240.

Another micro-carbon composition was prepared by adding 5 g of carbon black (e.g., VULCAN XC-72R, available from Cabot Co.) and 5 g of polytetrafluoroethylene to 495 ml of 2-propanol and mixing the resulting composition by using ultrasound. The micro-carbon composition was spray-coated onto a surface of a carbon paper (e.g., SGL Carbon Group carbon paper 10DA) to fabricate a cathode substrate including a carbon fiber based sheet coated with carbon black (e.g., Vulcan XC-72) in an amount of 1.3 mg/cm².

A catalyst composition was prepared by mixing 1 g of Pt black (Pt), 0.12 g of NAFION® polymer dispersion (available from E.I. duPont de Nemours and Co.), and 9 ml of an isopropyl alcohol solvent. The catalyst composition was spray-coated on the fabricated cathode substrate to form a catalyst layer and thereby prepare a cathode.

According to FIG. 8, anode 200 and cathode 400 were disposed on each side of a poly(perfluorosulfonic acid) membrane 300 (made of NAFION 115™) (available from E.I. duPont de Nemours and Co.) with catalyst layers 231 and 431 facing each other and assembled under a pressure of 200 kgf/cm² at 125° C. for approximately 5 minutes to prepare a membrane-electrode assembly 2. Catalyst layers 231 and 431 contact micro-carbons layer 221 in the anode substrate and micro-carbon layer 421 in the cathode substrate, respectively. Then, a fuel cell stack as shown in FIG. 4 was fabricated by stacking unit cells that were prepared and disposing separators on each side of the membrane-electrode assembly.

A fuel supplier including a fuel tank and a fuel pump, and an air pump were connected to the stack to fabricate a fuel cell.

COMPARATIVE EXAMPLE 1

A fuel cell was fabricated by the same method as in Example 1 except that a micro-carbon composition was prepared by adding 5 g of carbon black (Vulcan XC-72R, Cabot Co.) and 5 g of polytetrafluoroethylene to 350 ml of 2-propanol and mixing the resulting composition by using ultrasound to fabricate an anode substrate and a cathode substrate.

COMPARATIVE EXAMPLE 2

A fuel cell was fabricated by the same method as in Example 1 except that a micro-carbon composition was prepared by dipping carbon papers into the micro-carbon composition to separately fabricate an anode substrate and a cathode substrate.

Figure 2A:
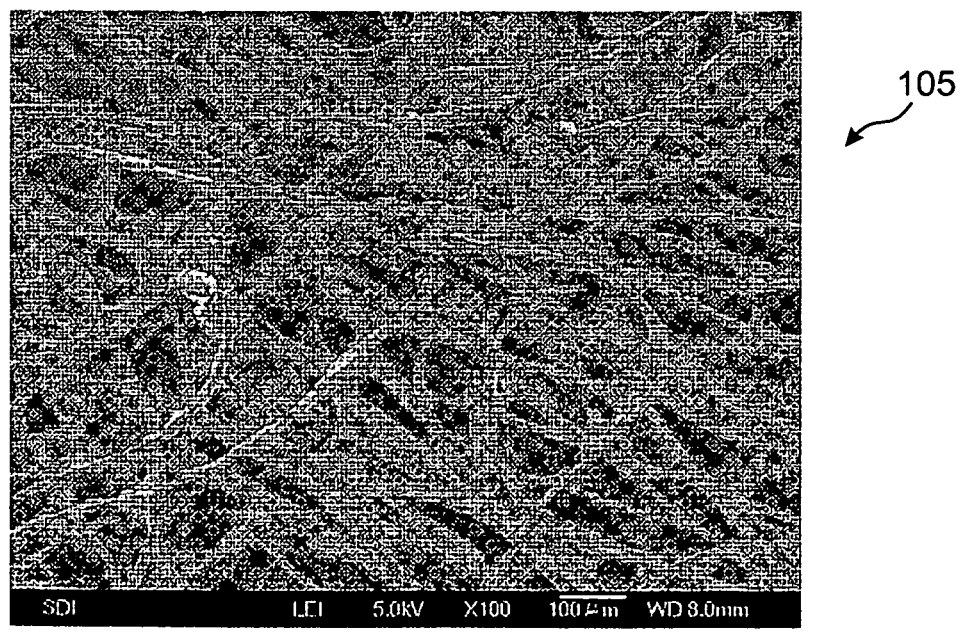
FIG. 2A is a scanning electron microscope photograph showing a surface of an anode substrate that includes a carbon fiber based sheet coated with micro-carbons in Example 1.
Figure 2B:
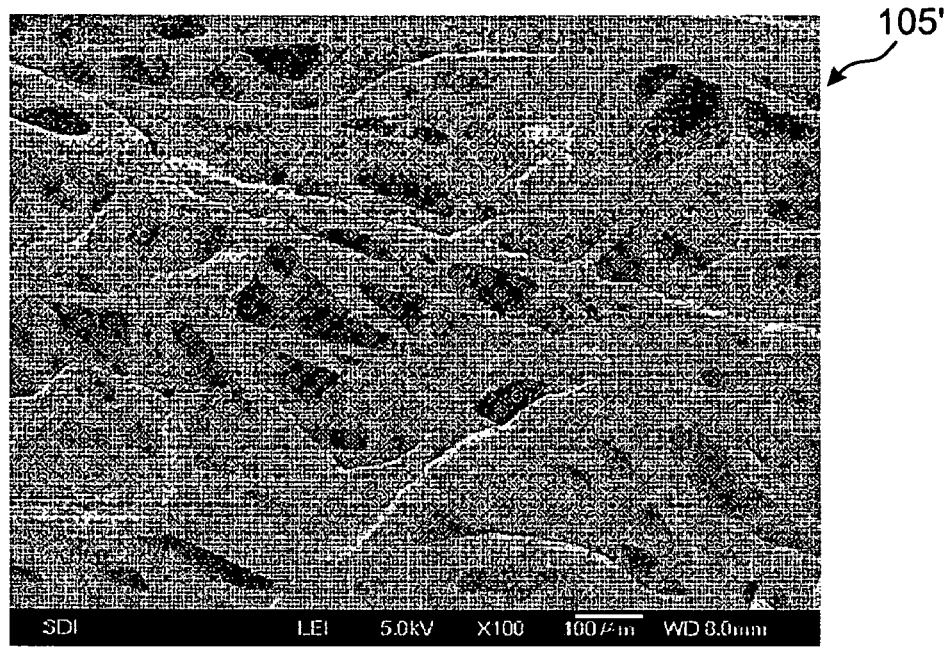
FIG. 2B is a scanning electron microscope photograph showing a surface of a cathode substrate that includes a carbon fiber based sheet coated with micro-carbons in Example 1.
Figure 2C:
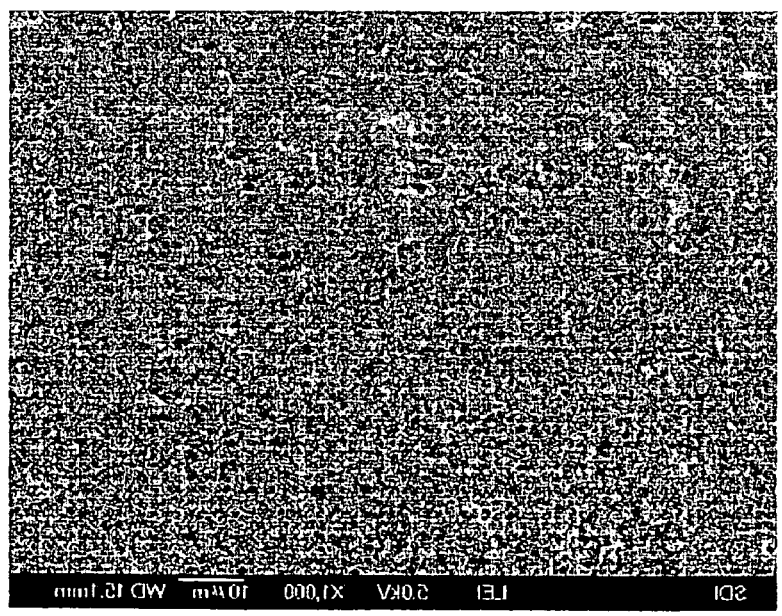
FIG. 2C is a scanning electron microscope photograph showing a surface of a micro-carbon layer formed on an electrode substrate in Comparative Example 1.

FIGS. 2A and 2B are respectively scanning electron microscope (SEM) photographs of the anode substrate and cathode substrate fabricated according to Example 1. FIG. 2C is a scanning electron microscope (SEM) of an electrode substrate constructed according to Comparative Example 1.

As shown in FIG. 2C, micro-carbons were coated as a separate layer onto an electrode substrate, and pores between the carbon fibers constituting the electrode substrate were interrupted by the micro-carbon layer, and therefore, carbon fiber skeletons and pores therebetween were not detected in the scanning electron microscopic photograph. However, small pores between the micro-carbons were detected.

As shown in FIGS. 2A and 2B, however, in Example 1, micro-carbons were coated without clogging the pores between the carbon fibers, so that carbon fiber skeletons and pores between the carbon fibers were detected in the scanning electron microscopic photographs.

Figure 5A:
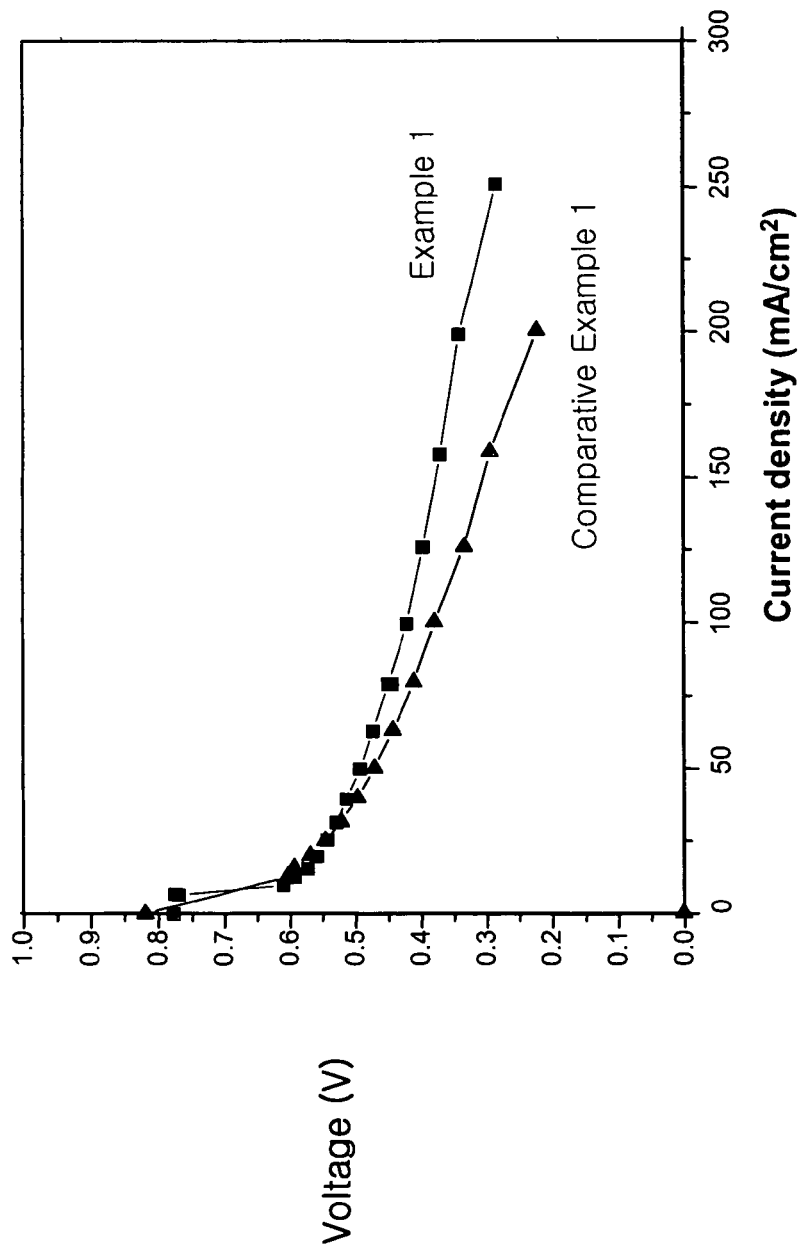
FIGS. 5A and 5B are graphs showing voltage versus current density and voltage versus power density, respectively, of Example 1 constructed according to the principles of the present invention and Comparative Example 1.
Figure 5B:
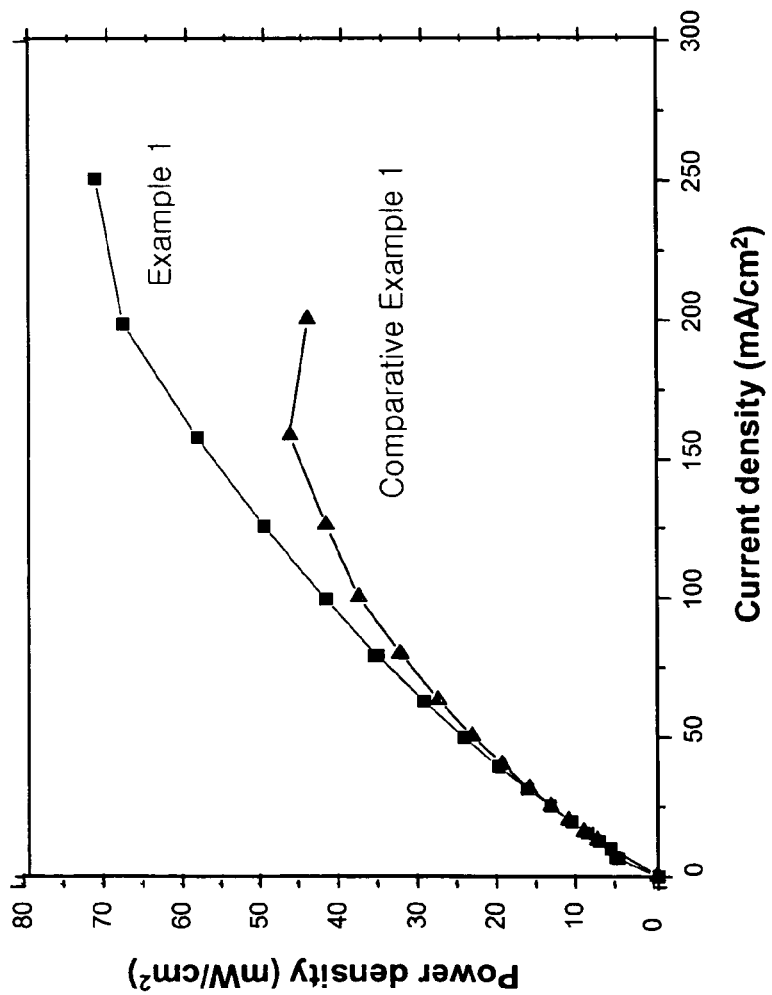

FIGS. 5A and 5B show voltage-current density curves and voltage-power density curves, respectively, of the fuel cells constructed according to Example 1 and Comparative Example 1.

As shown in FIG. 5, a fuel cell constructed according to Example 1, with an electrode substrate where carbon black is coated on a surface of a carbon fiber, has excellent current density characteristics when compared to a fuel cell constructed according to Comparative Example 1 with an electrode substrate where a micro-carbon layer is formed across a surface of a sheet of carbon paper.

Figure 6:
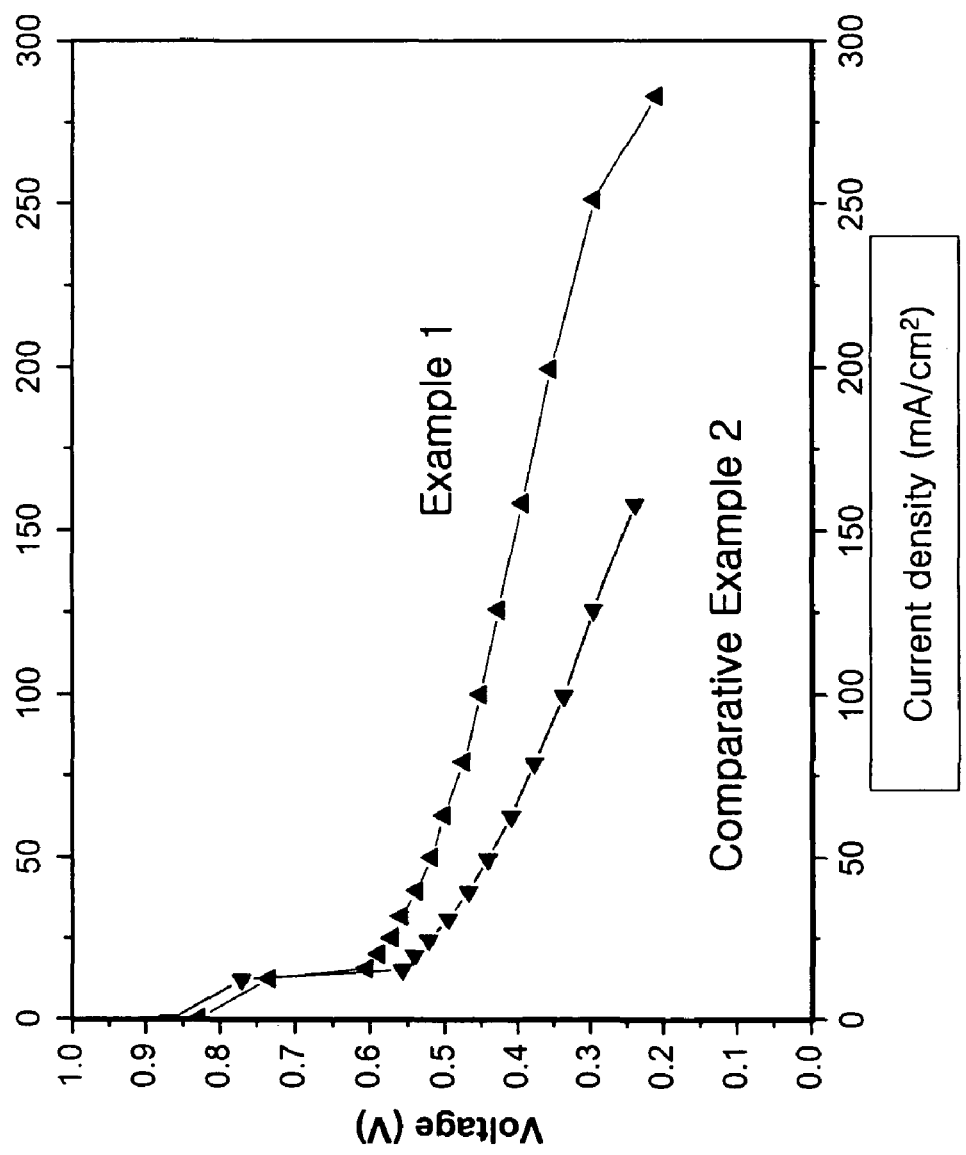
FIG. 6 shows voltage-current density curves of the fuel cells constructed according to Example 1 and Comparative Example 2.

FIG. 6 shows voltage-current density curves of the fuel cells constructed according to Example 1 and Comparative Example 2.

As shown in FIG. 6, a fuel cell constructed according to Example 1, with an electrode substrate where carbon black is coated on a surface of a carbon fiber, has excellent current density characteristics when compared to a fuel cell constructed according to Comparative Example 2 with an electrode substrate where all of carbon fibers are coated with micro-carbons.

A membrane-electrode assembly prepared according to the principles of the present invention has an advantage of improving performance of a fuel cell by intensifying a force of adherence between an electrode substrate and a catalyst layer, and permits a smooth mass transfer of a fuel, an oxidant, and water.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A membrane-electrode assembly comprising:
   an anode and a cathode facing each other; and
   a polymer electrolyte membrane disposed between the anode and the cathode;
   at least one of the anode and the cathode consisting of:
      an electrode substrate having micro-carbons formed on a top surface of a carbon fiber based sheet to integrally form a layer of the micro-carbons and the carbon fiber based sheet, the micro-carbons being carbon black or activated carbon; and
      a catalyst layer disposed on a surface of the electrode substrate facing the polymer electrolyte membrane, the catalyst layer including a metal catalyst, the micro-carbons contacting the metal catalyst, a porosity of the electrode substrate being 70% to 90%.

2. The membrane-electrode assembly of claim 1, wherein the electrode substrate is selected from the group consisting essentially of carbon paper, carbon cloth, carbon felt, and metal cloth.

3. The membrane-electrode assembly of claim 1, comprised of the carbon fibers being coated with a thickness of between 1 μm to 50 μm of the micro-carbons.

4. The membrane-electrode assembly of claim 3, comprised of the carbon fibers being coated with a thickness of between 5 μm to 20 μm of the micro-carbons.

5. The membrane-electrode assembly of claim 1, comprised of the micro-carbons being present in an amount of between 0.1 mg to 10 mg per 1 $cm^2$ of the electrode substrate.

6. The membrane-electrode assembly of claim 5, comprised of the micro-carbons being present in an amount of between 0.2 mg to 2 mg per 1 $cm^2$ of the electrode substrate.

7. The membrane-electrode assembly of claim 1, comprised of the electrode substrate of the anode comprising a carbon fiber coated with micro-carbons, and the micro-carbons coated on the carbon fiber contact the catalyst layer.

8. The membrane-electrode assembly of claim 1, comprised of the catalyst layer comprising at least one transition element selected from the group consisting of platinum, ruthenium, osmium, a platinum-ruthenium alloy, a platinum-osmium alloy, a platinum-palladium alloy, a platinum-M alloy, and combinations thereof, where M is selected from the group consisting of Ga, Ti, V, Cr, Mn, Fe, Co, Ni, Cu, Zn, Sn, Mo, W, Rh, and combinations thereof.

9. A fuel cell system, comprising:
at least one electricity generating element that generates electricity through oxidation of a fuel and reduction of an oxidant, and comprises
  a membrane-electrode assembly comprising:
    an anode and a cathode facing each other, and
    a polymer electrolyte membrane disposed between the anode and cathode, at least one of the anode and the cathode consisting of:
      an electrode substrate having micro-carbons formed on a top surface of a carbon fiber based sheet to integrally form a layer of the micro-carbons and the carbon fiber based sheet, the micro-carbons being carbon black or activated carbon, and
      a catalyst layer disposed on a surface of the electrode substrate facing the polymer electrolyte membrane, the catalyst layer including a metal catalyst, the micro-carbons contacting the metal catalyst, a porosity of the electrode substrate being 70% to 90%;
separators arranged at each side of the membrane-electrode assembly;
a fuel supplier disposed to supply the electricity generating element with a fuel; and
an oxidant supplier disposed to supply the electricity generating element with an oxidant.

10. The fuel cell system of claim 9, comprised of the carbon fibers being coated with a thickness of between 1 µm to 50 µm.

11. The fuel cell system of claim 10, comprised of the carbon fibers being coated with a thickness of between 5 µm to 20 µm.

12. The fuel cell system of claim 9, comprised of the micro-carbons being present in an amount of between 0.1 mg to 10 mg per 1 $cm^2$ of the electrode substrate.

13. The fuel cell system of claim 12, comprised of the micro-carbons being present in an amount of between 0.2 mg to 2 mg per 1 $cm^2$ of the electrode substrate.

14. The fuel cell system of claim 9, comprising a direct oxidation fuel cell system.

15. The fuel cell system of claim 9, wherein the electricity generating elements are stacked to form a fuel cell stack.

16. The fuel cell system of claim 9, wherein the polymer electrolyte membrane comprises proton conductive polymers selected from the group consisting essentially of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

17. The fuel cell system of claim 9, wherein the polymer electrolyte membrane has a thickness ranging from between 10 µm to 200 µm.

18. A membrane-electrode assembly comprising:
an anode and a cathode facing each other; and
a polymer electrolyte membrane disposed between the anode and the cathode;
at least one of the anode and the cathode consisting of:
  an electrode substrate having micro-carbons formed on a top surface of a carbon fiber based sheet to integrally form a layer in which the micro-carbons are coated on carbon fibers of the carbon fiber based sheet, the electrode substrate having a resin binder, the resin binder being mixed with the micro-carbons; and
  a catalyst layer disposed on a surface of the electrode substrate facing the polymer electrolyte membrane, the catalyst layer including a metal catalyst, the micro-carbons contacting the metal catalyst, a porosity of the electrode substrate being 70% to 90%.

* * * * *